United States Patent [19]

Delzer et al.

[11] Patent Number: 5,178,843
[45] Date of Patent: Jan. 12, 1993

[54] REMOVAL OF HYDROGEN SULFIDE FROM FLUID STREAMS

[75] Inventors: Gary A. Delzer; Dennis R. Kidd, both of Bartlesville, Okla.

[73] Assignee: Phillips Petroleum Company, Bartlesville, Okla.

[21] Appl. No.: 800,303

[22] Filed: Nov. 29, 1991

Related U.S. Application Data

[62] Division of Ser. No. 666,308, Mar. 8, 1991, Pat. No. 5,102,854.

[51] Int. Cl.$^5$ .............................................. C01B 17/16
[52] U.S. Cl. .................................. 423/220; 423/230; 423/244.06
[58] Field of Search .................. 423/220, 230, 244 R, 423/576, 576.5

[56]  References Cited

U.S. PATENT DOCUMENTS

| | | | |
|---|---|---|---|
| 3,928,540 | 12/1975 | Morgan | 423/339 |
| 4,044,114 | 8/1977 | Dezael et al. | 423/574 R |
| 4,088,736 | 5/1978 | Courty et al. | 423/230 |
| 4,371,728 | 2/1983 | Farha, Jr. et al. | 585/258 |
| 4,673,557 | 1/1987 | Nieskens et al. | 423/230 |
| 4,725,415 | 2/1988 | Kidd | 423/230 |
| 4,842,843 | 1/1989 | Pendergraft | 423/574 R |
| 5,077,261 | 12/1991 | Schubert | 502/408 |

Primary Examiner—Gary P. Straub
Assistant Examiner—Timothy C. Vanoy
Attorney, Agent, or Firm—Charles W. Stewart

[57] ABSTRACT

A novel sorbent comprising zinc oxide and a Group IIA metal silicate. A process for the removal of hydrogen sulfide from a fluid stream that comprises contacting a fluid stream with a novel sorbent. A further feature of this invention includes a novel method for preparing a composition comprising zinc oxide and a Group IIA metal silicate.

7 Claims, No Drawings

REMOVAL OF HYDROGEN SULFIDE FROM FLUID STREAMS

BACKGROUND OF THE INVENTION

This application is a division of application Ser. No. 07/666,308, which issued on Apr. 7, 1992 as U.S. Pat. No. 5,102,854.

This invention relates to a process for removing sulfur in the form of hydrogen sulfide from fluid streams. In another aspect, this invention relates to a composition suitable for use in such process.

The removal of sulfur from fluid streams can be desirable or necessary for a variety of reasons. If the fluid stream is to be released as a waste stream, removal of sulfur from the fluid stream can be necessary to meet the sulfur emission requirements set by various air pollution control authorities. Such requirements are generally in the range of about 10 ppm to 500 ppm of sulfur in the fluid stream. If the fluid stream is to be burned as a fuel, removal of sulfur from the fluid stream can be necessary to prevent environmental pollution. If the fluid stream is to be processed, removal of the sulfur is often necessary to prevent the poisoning of sulfur sensitive catalysts or to satisfy other process requirements.

A variety of methods employing regenerable, solid contact materials are known for removing sulfur from a fluid stream when the sulfur is present as hydrogen sulfide. For example, U.S. Pat. No. 4,088,736 discloses a composition comprising zinc oxide, alumina, and a Group IIA metal which is an effective sorbent for hydrogen sulfide and which possesses the property of being regenerable to the original sorbent state in the presence of oxygen when fully sulfided.

Although the sorbent employed in such methods may effectively adsorb or absorb, or both, hydrogen sulfide from a fluid stream containing hydrogen sulfide, it has been found that many of these sorbents effectively oxidize certain quantities of hydrogen sulfide to sulfur dioxide. The resulting sulfur dioxide is not removed from the fluid stream by the sorbent and, thus, passes through the contact material with the treated fluid stream. This phenomenon is sometimes called sulfur slippage. It is desirable to have a sorption material which has a high capacity to adsorb or absorb, or both, sulfur from a fluid stream and which minimizes the amount of sulfur slippage as well as being regenerable in the presence of oxygen after becoming fully sulfided.

SUMMARY OF THE INVENTION

It is thus an object of the present invention to provide a process for removing hydrogen sulfide from fluid streams containing hydrogen sulfide while simultaneously minimizing the amount of sulfur slippage. It is a further object of this invention to provide an improved sorbent which possesses the property of being regenerable to its original state in the presence of oxygen after becoming fully sulfided.

It has been found, in accordance with the present invention, that the addition of a Group IIA silicate to zinc oxide to produce a sorbent composition comprising zinc oxide and a Group IIA metal silicate provides a sorbent that is very effective in the removal of hydrogen sulfide from a fluid stream containing hydrogen sulfide, while significantly reducing, in comparison with various known sorbents, the amount of hydrogen sulfide that is oxidized to sulfur dioxide during the sorption process.

Other objects and advantages of the invention will be apparent from the foregoing description of the invention and the appended claims as well as from the detailed description of the invention which follows.

DETAILED DESCRIPTION OF THE INVENTION

Thus, in accordance with the present invention, a sorbent comprising zinc oxide and a Group IIA metal silicate is utilized to remove hydrogen sulfide from a fluid stream containing hydrogen sulfide. Additionally, the sorbent composition can contain a promoter metal selected from the group consisting of tungsten, molybdenum, and metals of Group VIII of the Periodic Table and mixtures of any two or more thereof. As used herein, the term "metals of Group VIII", or similar language, specifically include iron, cobalt, nickel, ruthenium, rhodium, palladium, osmium, iridium, and platinum. Additionally, the language "Group IIA" is used herein to specifically include beryllium, magnesium, calcium, strontium, and barium. Once the sorbent composition of the present invention has been prepared, fluid streams containing hydrogen sulfide are contacted with the sorbent under suitable sorption conditions to substantially reduce the concentration of hydrogen sulfide in the fluid stream without significantly increasing the concentration of sulfur dioxide therein.

As used herein, the terms "sorbent", "sorbent composition", "sorbent compounds", "sorbent material", "sorbent mixture", "sorption", "sorption process", "sorbed" and the like are utilized in a generic sense in referring to the mass transfer mechanisms and the mass transfer features described in this specification which can include, but are not limited to, absorption, chemi-absorption, adsorption and combinations thereof. Because it is uncertain as to the precise physical or chemical, or both, mechanisms which occur when employing the inventive compositions and processes described herein, the above listed terms, or any terms in similar form, are used for the sake of convenience and are not intended to limit in any way the present invention.

The sorption process is preferably carried out in cycles comprising a sorption period and a period for the regeneration of the sulfided sorbent. The sorption period comprises contacting a gaseous stream which contains hydrogen sulfide with the sorbent to thereby remove hydrogen sulfide from the gaseous stream. The sorbent becomes sulfided during the sorption period. When the sorbent becomes sulfided to the point that regeneration is desirable, preferably when it is nearly completely sulfided, an oxygen-containing gas is passed in contact with the sorbent to regenerate the sorbent and to convert the sorbed sulfur to a sulfur oxide.

The chemical changes that are believed to occur in the sorbent during this cyclic process are summarized in the following equations:

$$ZnO + H_2S \rightarrow ZnS + H_2O \qquad (I)$$

$$ZnS + Oxygen \rightarrow ZnO + SO_x \qquad (II)$$

The sorbent of the present invention can be utilized to remove hydrogen sulfide from any suitable gaseous stream. The hydrogen sulfide can be produced by the hydrodesulfurization of organic sulfur compounds or may be originally present in the gaseous stream as hydrogen sulfide. Examples of such suitable gaseous streams include light hydrocarbons such as methane, ethane, and natural gas; gases derived from petroleum products and products from extraction and/or liquefaction of coal and lignite; gases derived from tar sands and shale oil; coal derived synthesis gas; gases such as hydrogen and nitrogen; gaseous oxides of carbon; steam and the inert gases such as helium and argon. Gases that adversely affect the removal of hydrogen sulfide and which should be absent from the gaseous streams being processed are oxidizing agents, examples of which include air, molecular oxygen, the halogens, and the oxides of nitrogen.

The sorbent composition of the present invention can be utilized to remove hydrogen sulfide from olefins such as ethylene. This process, however, should be carried out in the absence of free hydrogen to avoid hydrogenation.

The sorbent employed in the process of the present invention can be prepared by any suitable method known in the art. Examples of such suitable methods include coprecipitation, dry mixing of solids, and slurrying. Once the sorbent has been prepared, it can be formed into a suitable contact material by any suitable method known in the art. Examples of such suitable methods include extrusion, pelletization, tabletting, and spray drying.

A preferred method for preparing the sorbent is to combine and intimately mix zinc oxide and a Group IIA silicate by any suitable method of mixing or blending. Suitable types of solids-mixing machines can include, but are not limited to, tumblers, stationary shells or troughs, muller mixers which are either batch type or continuous type, impact mixers, and the like. The blending of the solid particle components can be conducted during any suitable time period necessary to properly homogenize the mixture. Generally, however, the blending time is usually less than about 60 minutes. Preferably, the mixing time will be in the range of from about 2 minutes to about 30 minutes.

Following the mixing of the sorbent components, a dilute acid is added with continued mixing either in a batch wise fashion or a continuous fashion to form an extrudable paste. Suitable types of batch mixers include, but are not limited to, change-can mixers, stationary-tank mixers, double-arm kneading mixers having any suitable type of agitator blades such as sigma blades, dispersion blades, multiwiping overlap blades, single curve blades, double-naben blades, and the like. Suitable types of continuous mixers can include, but are not limited to, single or double screw extruders, trough-and-screw mixers and pug mills. To achieve the desired dispersion of the sorbent components, the materials are mixed until a homogenous mixture is formed. The mixing time should be sufficient to give a uniform mixture and generally, will be less than about 45 minutes. Preferably, the mixing time will be in the range of from about 2 minutes to about 15 minutes. The extrudable paste is then extruded, dried, and calcined to form a sorbent agglomerate.

The dilute acid used to form the extrudable paste can be added to the mixture of zinc oxide and Group IIA silicate by any suitable method. Preferably, the dilute acid is added to the resulting mixture by spraying it within the mixer during continued mixing. Any suitable acid can be used in the preparation of the sorbent. Examples of suitable acids include nitric acid, acetic acid, sulfuric acid, and hydrochloric acid. Nitric acid is the preferred acid. The acid concentration of the dilute acid employed in the preparation of the sorbent will generally be in the range of from about 1.0 weight percent to about 15 weight percent, and will preferably be in the range of about 1.0 weight percent to about 5.0 weight percent. The weight percent of the acid is expressed in terms of the concentrated acid as a fraction of the total weight of the dilute acid multiplied by a factor of one hundred.

The zinc oxide used in the preparation of the sorbent can be either in the form of zinc oxide, or in the form of one or more zinc compounds that are convertible to zinc oxide under the conditions of preparation described herein. Examples of such zinc compounds include zinc sulfide, zinc sulfate, zinc hydroxide, zinc carbonate, zinc acetate, and zinc nitrate. Preferably, the zinc oxide is in the form of powdered zinc oxide.

The Group IIA metal silicate used in the invention can be any suitable type of silicate including, for example, any naturally occurring silicate compounds and synthetic silicate compounds. The silicate compounds generally consist of tetrahedral $SiO_4$ units linked together in a manner to form negatively charged complexes bonded together by metal cations. The metal cations, which bond with the silicate anion, can be any suitable metal cation; but, preferably, the metal cation is a Group IIA metal. The most preferred metal silicates used in the invention are the calcium silicates and magnesium silicates. Any of the many calcium silicate compounds can be used in this invention such as, for example, calcium metasilicate ($CaSiO_3$), dicalcium silicate ($2CaO \cdot SiO_2$), synthetic silicate, natural diatomaceous silica, and Portland cement. Any of the many available magnesium silicate compounds can be used in this invention, for example, magnesium silicate ($3MgSiO_3 \cdot 5 H_2O$), magnesium trisilicate comprising 20 percent magnesium oxide and 45 percent silica, and any natural hydrous magnesium silicate such as talc.

The extrudable paste is extruded by methods well known in the art. The extruded material is then dried at a temperature generally in the range of from about 75° C. to about 300° C., and more preferably in the range of from about 90° C. to about 250° C., for a period of time generally in the range of from about 0.5 hour to about 4 hours, and more preferably in the range of from about 1 hour to about 3 hours. The dried, extruded material is then calcined in the presence of oxygen at a temperature generally in the range of from about 375° C. to about 750° C., and more preferably in the range of from about 500° C. to about 700° C., for a period of time generally in the range of from about 0.5 hour to about 4 hours, and more preferably in the range of from about 1 hour to about 3 hours to produce the sorbent employed in the process of the present invention.

The zinc oxide portion of the zinc oxide and Group IIA silicate mixture will generally be present in the sorbent in an amount in the range of from about 10 weight percent to about 95 weight percent, and will more preferably be in the range of from about 35 weight percent to about 95 weight percent, and will most preferably be in the range of from about 45 weight percent to about 85 weight percent. As used herein the language "weight percent", when referring to the sorbent mixture, is defined as parts by weight per 100 parts by weight of the total combined weight of zinc oxide and Group IIA silicate multiplied by a factor of one hundred.

The Group IIA silicate will generally be present in the sorbent in an amount in the range of from about 5 weight percent to about 90 weight percent and will more preferably be in the range of from about 5 weight percent to about 65 weight percent, and will most preferably be in the range of from about 15 weight percent to about 55 weight percent.

The sorbent employed in the process of the present invention can be promoted with any suitable metal oxides. Examples of such suitable metal oxides can include the oxides of molybdenum, tungsten, metals of Group VIII of the Periodic Table, mixtures of two or more thereof, and any other metal that is known to have hydrogenation ability of the type necessary to reduce sulfur oxide species to hydrogen sulfide or to have the ability to assist in sorbent regeneration. In a preferred embodiment of the present invention, the sorbent is promoted with nickel oxide.

The metal oxide promoter can be added to the sorbent in the form of the elemental metal, metal oxide, and/or metal-containing compounds that are convertible to metal oxides under the calcining conditions described herein. Some examples of such metal-containing compounds include metal acetates, metal carbonates, metal nitrates, metal sulfates, metal thiocyanates, and mixtures of two or more thereof.

The elemental metal, metal oxide, and/or metal-containing compounds can be added to the sorbent by any method known in the art. One such method is the impregnation of the sorbent with a solution, either aqueous or organic, that contains the elemental metal, metal oxide, and/or metal-containing compounds. After the elemental metal, metal oxide, and/or metal-containing compounds have been added to the sorbent, the promoted composition is dried and calcined, as described hereinafter.

As previously noted herein, the elemental metal, metal oxide, and/or metal-containing compounds can be added to the sorbent as components of the original mixture, or they can be added after the sorbent has initially been dried and calcined. If the metal oxide promoter is added to the sorbent after it has initially been dried and calcined, then the now-promoted composition is dried and calcined a second time to form the promoted sorbent. The now-promoted composition is generally dried at a temperature in the range of from about 75° C. to about 300° C., more preferably in the range of from about 90° C. to about 250° C., for a period of time generally in the range of from about 0.5 hour to about 8 hours, more preferably in the range of from about 3 hours to about 5 hours. The dried, promoted composition is then calcined in the presence of oxygen generally at a temperature in the range of from about 375° C. to about 750° C., and more preferably in the range of from about 500° C. to about 700° C., until volatile matter is removed and the elemental nickel and/or the nickel-containing compounds are substantially converted to nickel oxides. The time required for this calcining step will generally be in the range of about 0.5 hour to about 4 hours, and will preferably be in the range of about 1 hour to about 3 hours.

The metal oxide promoter will generally be present in the sorbent in an amount in the range of from about 0.1 weight percent to about 15 weight percent, and will more preferably be in the range of from about 2.0 weight percent to about 7.5 weight percent, most preferably about 6.0 weight percent, wherein said weight percent is expressed in terms of the metal as a fraction of the total combined weight of the zinc oxide and Group IIA silicate multiplied by a factor of 100.

The processes of the present invention can be carried out by means of any apparatus whereby there is achieved an alternate contact of the sorbent with the gaseous feed stream and, thereafter, of the sorbent with an oxygen-containing gas which is utilized to regenerate the sorbent. The process is in no way limited to the use of a particular apparatus. The process of this invention can be carried out using a fixed bed of sorbent, a fluidized bed of sorbent, or a moving bed of sorbent. Presently preferred is the use of a fixed bed of sorbent.

In order to avoid any casual mixing of the gaseous feed stream containing hydrogen sulfide with the oxygen-containing gas utilized in the regeneration step, provision is preferably made for terminating the flow of the gaseous feed stream to the reactor and subsequently injecting an inert purging fluid such as nitrogen, carbon dioxide or steam. Any suitable purge time can be utilized but the purge should be continued until all hydrocarbon and/or hydrogen sulfide are removed. Any suitable flow rate of the purge fluid may be utilized for removing hydrocarbon and/or hydrogen sulfide. A presently preferred purge fluid flow rate is one which will give a gaseous hourly space velocity (GHSV) in the range of about 800 GHSV to about 1200 GHSV. As used herein, the term "gaseous hourly space velocity" is defined as the ratio of the gaseous volumetric flow rate at standard conditions of 60° F. and one atmosphere of pressure to the reactor volume.

Any suitable temperature for the processes of the present invention may be utilized. The temperature will generally be in the range of from about 150° C. to about 600° C. and will more preferably be in the range of from about 200° C. to about 450° C.

Any suitable temperature may be utilized to regenerate the sorbent from its sulfided form back to the original sorbent form. The temperature will generally be in the range of from about 370° C. to about 815° C. As a result of parallel work, however, it has been discovered that the higher temperatures required to initiate the regeneration of ZnS to ZnO (i.e. about 650° C. and higher) has an adverse effect on the amount of sulfur loading during the subsequent sorption cycle. Due to the fact that the regeneration of NiS to NiO is an exothermic reaction, and the fact that this reaction is initiated at a lower temperature (i.e. about 425° C.), the presence of nickel oxide in the sorbent employed in the process of the present invention allows the regeneration to occur at a lower temperature, thereby preventing the adverse effect described above. Thus, the regeneration temperature is preferably in the range of from about 425° C. to about 600° C. to effect the regeneration within a reasonable time while not adversely affecting the production of sulfur dioxide in the treated gaseous feed stream.

Any suitable pressure can be utilized for the processes of the present invention. The pressure of the gaseous feed stream being treated is not believed to have an important effect on the sorption process of the present invention, and will generally be in the range of from about atmospheric to about 2,000 psig during the treatment.

When the sorbent is completely sulfided it will no longer combine with the hydrogen sulfide in the manner set forth in Equation (I). When this condition occurs, hydrogen sulfide will begin to appear in the effluent flowing from the reaction and this will be an indication that the sorbent should preferably be regenerated. The time required for the sorbent to become completely sulfided will generally be a function of the concentration of sulfur in the feedstock and feed rate employed.

When the sorbent becomes substantially completely sulfided, the sorbent is typically regenerated by terminating the flow of feed to the reactor and purging with an inert fluid such as nitrogen to remove any combustibles. A free oxygen-containing gas is then introduced to the reactor for the purpose of oxidizing the zinc sulfide in accordance with Equation (II).

The amount of oxygen supplied to the reactor during the regeneration step will generally be sufficient to at least substantially remove sulfur from the sorbent. The regeneration step is generally conducted at about atmospheric pressure. The temperature for the regeneration step is generally maintained in the range of from about 370° C. to about 815° C. in order to oxidize the zinc sulfide within a reasonable time.

The following examples are presented in further illustration of the invention.

EXAMPLE I

This example describes the sorbent materials which were tested in accordance with the procedures set forth in Example II.

Sorbent A was a blend which comprised 80 weight percent zinc oxide (ZnO) and 20 weight percent calcium silicate said blend having been promoted with about 7 weight percent nickel. Sorbent A was prepared by mixing 80 grams of a zinc oxide compound with 20 grams of a calcium silicate compound. Any commercially available zinc oxide and calcium silicate can be used, but in this case, a zinc oxide, which was commercially available from St. Joe Chemical Corporation, was used. The calcium silicate used was commercially available from Johns-Mansville Corporation and is known by its trade name Micro-Cel. The zinc oxide and calcium silicate were dry mixed for a period of about 3 minutes followed by mulling with a mulling solution to form an extrudable paste. A total weight of 66.51 grams of this mulling solution comprising nitric acid and water was added to the dry mixture of zinc oxide and calcium silicate in an amount necessary to give a desired consistency required for extrusion. The mulling solution used was separately prepared in stock quantities by premixing 1.234 parts by weight of concentrated nitric acid with 98.766 parts by weight water. The resultant mulled mixture was extruded to form an extrudate. The extrudate was then air dried for a period of about 24 hours followed by a drying step in an oven at 110° C. for about 3 hours. After the drying step, the extrudate was then calcined at about 500° C. for a period of about 3 hours.

To add a nickel promoter to the calcined extrudate, a standard incipient wetness process was followed to impregnate the extrudate. To perform the incipient wetness process, the pore volume of the extrudate was calculated and, based on the calculated pore volume, an impregnating solution of nickel nitrate hexahydrate and water was prepared so that when added to the extrudate the amount of water added would equal the total pore volume of the material being impregnated and so that the desired amount of nickel promoter would be added to the material. Using this process, 25 grams of extrudate was impregnated with a nickel nitrate solution comprising 7.43 grams nickel nitrate hexahydrate and 11.31 grams water. The impregnated extrudate was then dried under a heat lamp for a period of about 1 hour followed by a drying step in an oven at 110° C. for 3 hours. After the drying, the material was calcined for 3 hours at 500° C.

Sorbent B was a blend which comprised 80 weight percent zinc oxide (ZnO) and 20 weight percent magnesium silicate said blend having been promoted with about 7 weight percent nickel. Sorbent B was prepared by mixing 80 grams of a zinc oxide compound with 21.12 grams of a magnesium silicate compound. Any commercially available zinc oxide and magnesium silicate can be used, but in this case, a zinc oxide, which was commercially available from St. Joe Chemical Corporation, was used. The magnesium silicate used was commercially available from Mallinckrodt Corporation and is known by its generic name, talc. The zinc oxide and magnesium silicate were dry mixed for a period of about 3 minutes followed by mulling with a mulling solution to form an extrudable paste. A total weight of 24.78 grams of this mulling solution of nitric acid and water was added to the dry mixture of zinc oxide and magnesium silicate in an amount necessary to give a desired consistency required for extrusion. The mulling solution used was separately prepared in stock quantities by premixing 1.234 parts by weight of concentrated nitric acid with 98.766 parts by weight of water. The resultant mulled mixture was extruded to form an extrudate. The extrudate was air dried for a period of about 24 hours followed by a drying step in an oven at 110° C. for about 3 hours. After the drying step, the extrudate was then calcined at about 500° C. for a period of about 3 hours.

To add a nickel promoter to the calcined extrudate, a standard incipient wetness process was followed to impregnate the extrudate. To perform the incipient wetness process, the pore volume of the extrudate was calculated and, based on the calculated pore volume, an impregnating solution of nickel nitrate hexahydrate and water was prepared so that when added to the extrudate the amount of water added would equal the total pore volume of the material being impregnated and so that the desired amount of nickel promoter would be added to the material. Using this process, 25 grams of extrudate was impregnated with a nickel nitrate solution comprising 7.43 grams nickel nitrate hexahydrate and 4.57 grams water. The impregnated extrudate was then dried under a heat lamp for a period of about 1 hour followed by a drying step in an oven at 110° C. for 3 hours. After the drying, the material was calcined for 3 hours at 500° C.

The comparative composition, Sorbent C, was a mixture of zinc oxide and alumina that was prepared as follows. About 11.2 parts by weight of Catapal D alumina, in a powdered form, was mixed with 35.4 parts by weight of powdered zinc oxide. After mixing the alumina and zinc oxide, 20.4 parts by weight of an aqueous acid solution was added with continued mixing for a period of about 12 minutes. The thus formed mixture was aged for a period of 30 minutes, followed by extrusion of the resulting paste to form an extrudate. The extrudate was dried in air at a temperature of about 135° C. for a time period of about 6 hours. The dried extrudate was then calcined at a temperature of 635° C. for about 1 hour. A portion of the calcined extrudate was then impregnated with a solution containing 17.3 parts by weight nickel nitrate hexahydrate and the appropriate quantity of water to provide for impregnation by incipient wetness. The impregnated calcined extrudate was then dried for 6 hours at about 135° C., and then calcined at 635° C. for an additional 1 hour to form the comparison composition.

Sorbent D was a blend which comprised 50 weight percent zinc oxide (ZnO) and 50 weight percent calcium silicate said blend having been promoted with about 7 weight percent nickel. Sorbent D was prepared by mixing 50 grams of a zinc oxide compound with 50 grams of a calcium silicate compound. Any commercially available zinc oxide and calcium silicate can be used, but in this case, a zinc oxide, which was commercially available from St. Joe Chemical Corporation, was used. The calcium silicate used was commercially available from Johns-Mansville Corporation and is known by its trade name Micro-Cel. The zinc oxide and calcium silicate were dry mixed for a period of about 3 minutes followed by mulling with a mulling solution to form an extrudable paste. A total weight of 66.51 grams of this mulling solution comprising nitric acid and water was added to the dry mixture of zinc oxide and calcium silicate in an amount necessary to give a desired consistency required for extrusion. The mulling solution used was separately prepared in stock quantities by premixing 1.234 parts by weight of concentrated nitric acid with 98.766 parts by weight water. The resultant mulled mixture was extruded to form an extrudate. The extrudate was then air dried for a period of about 24 hours followed by a drying step in an oven at 110° C. for about 3 hours. After the drying step, the extrudate was then calcined at about 500° C. for a period of about 3 hours.

To add a nickel promoter to the calcined extrudate, a standard incipient wetness process was followed to impregnate the extrudate. To perform the incipient wetness process, the pore volume of the extrudate was calculated and, based on the calculated pore volume, an impregnating solution of nickel nitrate hexahydrate and water was prepared so that when added to the extrudate the amount of water added would equal the total pore volume of the material being impregnated and so that the desired amount of nickel promoter would be added to the material. Using this process, 25 grams of extrudate was impregnated with a nickel nitrate solution comprising 7.43 grams nickel nitrate hexahydrate and the appropriate quantity of water. The impregnated extrudate was then dried under a heat lamp for a period of about 1 hour followed by a drying step in an oven at 110° C. for 3 hours. After the drying, the material was calcined for 3 hours at 500° C.

Sorbent E was a blend which comprised 50 weight percent zinc oxide (ZnO) and 50 weight percent magnesium silicate said blend having been promoted with about 7 weight percent nickel. Sorbent E was prepared by mixing 50 grams of a zinc oxide compound with 52.8 grams of a magnesium silicate compound. Any commercially available zinc oxide and magnesium silicate can be used, but in this case, a zinc oxide, which was commercially available from St. Joe Chemical Corporation, was used. The magnesium silicate used was commercially available from Mallinckrodt Corporation and is known by its generic name, talc. The zinc oxide and magnesium silicate were dry mixed for a period of about 3 minutes followed by mulling with a mulling solution to form an extrudable paste. A total weight of 24.78 grams of this mulling solution of nitric acid and water was added to the dry mixture of zinc oxide and magnesium silicate in an amount necessary to give a desired consistency required for extrusion. The mulling solution used was separately prepared in stock quantities by premixing 1.234 parts by weight of concentrated nitric acid with 98.766 parts by weight of water. The resultant mulled mixture was extruded to form an extrudate. The extrudate was air dried for a period of about 24 hours followed by a drying step in an oven at 110° C. for about 3 hours. After the drying step, the extrudate was then calcined at about 500° C. for a period of about 3 hours.

To add a nickel promoter to the calcined extrudate, a standard incipient wetness process was followed to impregnate the extrudate. To perform the incipient wetness process, the pore volume of the extrudate was calculated and, based on the calculated pore volume, an impregnating solution of nickel nitrate hexahydrate and water was prepared so that when added to the extrudate the amount of water added would equal the total pore volume of the material being impregnated and so that the desired amount of nickel promoter would be added to the material. Using this process, 25 grams of extrudate was impregnated with a nickel nitrate solution comprising 7.43 grams nickel nitrate hexahydrate and the appropriate quantity of water to provide for impregnation by incipient wetness. The impregnated extrudate was then dried under a heat lamp for a period of about 1 hour followed by a drying step in an oven at 110° C. for 3 hours. After the drying, the material was calcined for 3 hours at 500° C.

The comparative composition, Sorbent F, was a mixture of zinc oxide and alumina that was prepared as follows. About 27.9 parts by weight of Catapal D alumina, in a powdered form, was mixed with 22.1 parts by weight of powdered zinc oxide. After mixing the alumina and zinc oxide, 20.4 parts by weight of an aqueous acid solution was added with continued mixing for a period of about 12 minutes. The thus formed mixture was aged for a period of 30 minutes, followed by extrusion of the resulting paste to form an extrudate. The extrudate was dried in air at a temperature of about 135° C. for a time period of about 6 hours. The dried extrudate was then calcined at a temperature of 635° C. for about 1 hour. A portion of the calcined extrudate was then impregnated with a solution containing 17.3 parts by weight nickel nitrate hexahydrate and 33 parts by weight of water. The impregnated calcined extrudate was then dried for 6 hours at about 135° C., and then calcined at 635° C. for an additional 1 hour to form the comparison composition.

EXAMPLE II

In this example, the experimental procedure for the removal of hydrogen sulfide from gas streams containing hydrogen sulfide by means of various solid sorbent materials is described.

A reactor was filled with 10 grams of the particular sorbent (either sorbents A, B, D and E or comparative sorbents C and F), with a layer of quartz chips above and below the sorbent. The reactor, which was maintained at a pressure of about 2 psig, was operated in a fixed bed, downflow mode. Within the reactor, the sorbent was heated to the desired operating temperature by a stream of nitrogen gas. When the desired temperature of about 800° F. to about 850° F. was attained, the nitrogen flow was stopped, and the simulated sulfur plant gas and, when used, water vapor flows were started. The water vapor was generated by pumping water through a heated line that was connected to the top of the reactor. The reaction was carried out at a reaction temperature of about 800° F. to about 850° F. and a gas hourly space velocity of 2500 cc/cc adsorbent/hour. The composition of the simulated sulfur plant gas was either (a) 1.4 volume percent hydrogen sulfide, 13.3 volume percent carbon dioxide, and 85.3 volume percent nitrogen or (b) 1.4 volume percent hydrogen sulfide and 98.6 volume percent nitrogen.

The sorbent was used in a cyclic manner which is a part of the novel process. A complete process cycle consists of a contacting step, whereby an $H_2S$ containing stream is brought into contact with the sorbent and in which sulfur is removed from the fluid stream, and a regeneration step. Once the sorbent becomes spent, as can sometimes be evidenced by increases in the amount of $H_2S$ that breaks through the bed of sorbent, the fluid stream being treated is discontinued and the sorbent is regenerated by passing a gas containing free oxygen in contact with the sorbent. The oxygen contained in the regeneration gas serves to convert the sulfur or sulfur compounds on the sorbent to an oxide compound, and to drive off of the sorbent the sulfur.

The progress of the sorption process was followed by measuring the concentration of hydrogen sulfide or sulfur dioxide, or both, in the reactor effluent after the water vapor had been condensed and removed from the effluent. The concentration of hydrogen sulfide or sulfur dioxide, or both, was measured with Draeger tubes that were suited to the concentration ranges encountered.

Once the sorbents became fully sulfided, as evidenced by hydrogen sulfide breakthrough, the flow of the simulated sulfur plant gas to the reactor was halted and the reactor was purged with nitrogen for a period of about 20 minutes while being heated to a regeneration in the presence of air for about 1.5 hours. Following regeneration, the reactor was again purged with nitrogen for about 50 minutes while being cooled back down to the reaction temperature of about 800° F. to about 850° F. The nitrogen purge was then halted and the simulated sulfur plant gas was fed to the reactor to begin another sorption cycle.

EXAMPLE III

The results of the experimental procedure described in detail in Example II are presented in Table I. The results presented in Table I demonstrate that the novel compositions, Sorbents A, B, D, and E, when used in the novel process, significantly reduce the amount of sulfur slippage over that which is observed for the comparative Sorbent C while still providing comparable sulfur loading capacities.

TABLE I

| | Cycle Number | SO₂ slippage (ppm) | Sulfur Loading (weight %) |
|---|---|---|---|
| Sorbent A | 5 | 760 | 9.9 |
| (80% zinc oxide/20% | 6 | 700 | 9.9 |
| calcium silicate) | 24 | 790 | 9.9 |
| Sorbent B | 7 | 1400 | 7.5 |
| (80% zinc oxide/20% | 8 | 500 | 7.9 |
| magnesium silicate) | 12 | 740 | 5.7 |
| Sorbent C | 1 | 200 | 14.8 |
| Comparative Sorbent | 2 | 700 | 15.7 |
| (80% zinc oxide/20% | 3 | 575 | 16.8 |
| alumina) | 4 | 625 | 14.1 |
| | 5 | 625 | 15.0 |
| | 6 | 650 | 15.2 |
| | 7 | 675 | 13.7 |
| | 8 | 700 | 12.6 |
| | 9 | 700 | 10.7 |
| | 10 | 725 | 10.0 |
| | 11 | 725 | 10.0 |
| | 12 | 725 | 8.8 |
| | 13 | 725 | 8.9 |
| | 14 | 850 | 7.5 |
| | 15 | 970 | 7.9 |
| | 16 | 870 | 7.9 |
| | 17 | 900 | 7.3 |

TABLE I-continued

| | Cycle Number | SO₂ slippage (ppm) | Sulfur Loading (weight %) |
|---|---|---|---|
| Sorbent D | 1 | 330 | 8.1 |
| (50% zinc oxide/50% | 2 | 280 | 6.2 |
| calcium silicate) | 3 | 380 | 7.1 |
| | 4 | 450 | 8.7 |
| | 5 | 490 | 9.8 |
| | 6 | 540 | 10.4 |
| | 7 | 450 | 10.4 |
| | 8 | 650 | 10.6 |
| | 9 | 540 | 10.6 |
| | 10 | 600 | 11.4 |
| | 11 | 900 | 11.6 |
| | 12 | 600 | 11.9 |
| | 13 | 600 | 11.9 |
| | 14 | 480 | 11.9 |
| | 15 | 600 | 11.2 |
| Sorbent E | 1 | 150 | 15.2 |
| (50% zinc oxide/50% | 2 | 470 | 16.4 |
| magnesium silicate) | 3 | 460 | 15.7 |
| | 4 | 460 | 15.2 |
| | 5 | 470 | 14.6 |
| | 6 | 490 | 14.0 |
| | 7 | 500 | 12.8 |
| | 8 | 515 | 12.8 |
| | 9 | 540 | 12.1 |
| | 10 | 540 | 11.6 |
| | 11 | 560 | 11.2 |
| | 12 | 560 | 10.4 |
| | 13 | 580 | 9.8 |
| | 14 | 700 | 9.0 |
| | 15 | 800 | 8.1 |
| | 16 | 770 | 7.9 |
| | 17 | 820 | 7.9 |
| Sorbent F | 12 | 740 | 5.7 |
| Comparative Sorbent | 6 | 1800 | 9.5 |
| (50% zinc oxide/50% | 7 | 1680 | 8.5 |
| alumina) | | | |

While this invention has been described in detail for purposes of illustration, it is not to be construed or limited thereby but is intended to include all reasonable variations and modifications within the scope and spirit of the described invention and the appended claims.

That which is claimed is:

1. A sorption process which comprises:
   contacting a fluid stream containing hydrogen sulfide with a composition consisting essentially of zinc oxide and a Group IIA metal silicate.

2. A process in accordance with claim 1 wherein the concentration of said zinc oxide is in the range of from about 35 weight percent to about 95 weight percent, based upon the total combined weight of said zinc oxide and said Group IIA metal silicate.

3. A process as recited in claim 2 wherein said Group IIA metal silicate is selected from the group of metal silicates consisting of magnesium silicate, calcium silicate and mixtures thereof.

4. A sorption process which comprises: contacting a fluid stream containing hydrogen sulfide with a composition consisting essentially of zinc oxide, a Group IIA metal silicate, and a promoter metal oxide wherein the metal of said promoter metal oxide is selected from the group consisting of tungsten, molybdenum, Group VIII metals and mixtures thereof.

5. A process in accordance with claim 4 wherein the concentration of said zinc oxide is in the range of from about 35 weight percent to about 95 weight percent, based upon the total combined weight of said zinc oxide and said Group IIA metal silicate.

6. A process in accordance with claim 5 wherein said Group IIA metal silicate is selected from the group of metal silicates consisting of magnesium silicate, calcium silicate and mixtures thereof.

7. A process in accordance with claim 6 wherein the concentration of said promoter metal oxide is in the range of from about 0.1 weight percent to about 15 weight percent based upon the total combined weight of said zinc oxide and said Group IIA metal silicate.

* * * * *